April 30, 1935.      T. W. CASE      1,999,653
SOURCE OF LIGHT
Filed July 23, 1928
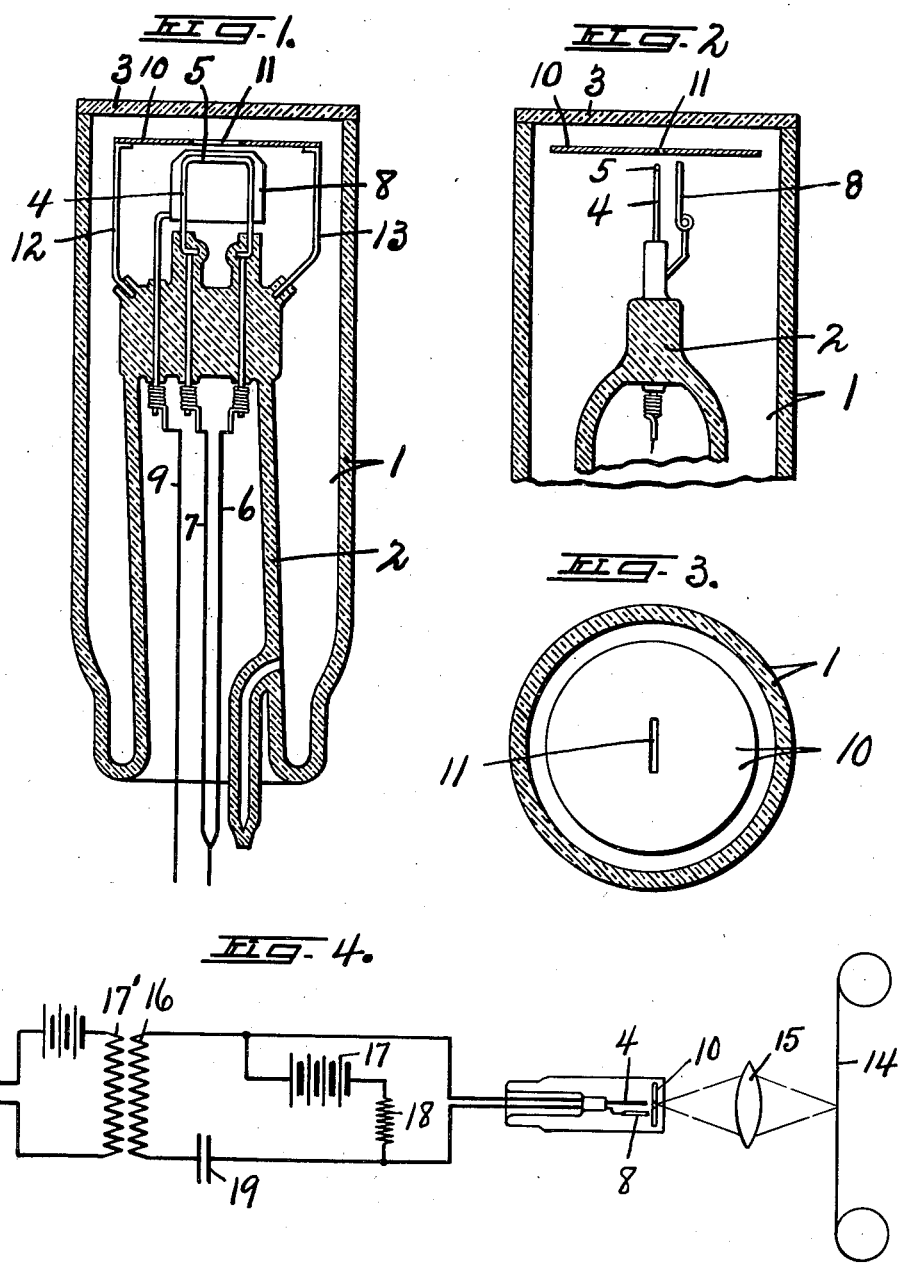

Patented Apr. 30, 1935

1,999,653

UNITED STATES PATENT OFFICE 1,999,653

SOURCE OF LIGHT

Theodore Willard Case, Auburn, N. Y.

Application July 23, 1928, Serial No. 294,865

2 Claims. (Cl. 176—122)

This invention relates to certain new and useful improvements in a source of light for producing a photographic record of light wave variations corresponding to sound wave variations. In the production or reproduction of a photographic record of light waves corresponding to sound wave variations it has in some cases been customary to move the sensitized element or film past a wall having a narrow elongated slit therein and through which slit the light passes to the film. With such an apparatus movement of the film past the slit with the film coming in contact with the edges of the slit it is found that foreign material collects in the slit and obstructs or partially obstructs the slit passage, some of this material may be scraped from the film itself and other portions may be accumulations of dust or the like. As a result the passage of the light rays to the film is somewhat obstructed and an accurate sharply defined record is not produced and reproduction is unsatisfactory due to the same cause.

As an alternate arrangement it has heretofore been proposed to omit the slit adjacent the film and to focus the image of a line of light upon the film, such focused line of light being of a size substantially the same as the size of a suitable slit, this latter arrangement contemplates the use either of a straight line filament as the source of a line of light or it may be the image of a suitably formed slit. Under either condition the source of the line of light is spaced a considerable distance from the film and this results in a substantial loss of light intensity.

Where a film is moved past a slit in contact with the wall in which the slit is formed it is possible to place the source of light very close to the slit and, therefore, very close to the film and under such conditions the present known sources of light for this purpose are of sufficient intensity to produce an accurate and sharply defined record, but on the other hand where a focused line of light is used which may be termed an optical slit the present known source of light has not the required intensity to produce a sufficiently intense light at a slit spaced some distance from it which when focused upon the film will produce the required density of record.

The main object of this invention therefore resides in the production of a source of light for the purpose described capable of satisfactory use in an arrangement which includes focusing the image of a slit upon the film for producing the photographic sound record.

Other objects and advantages relate to the details of the structure and the form, relation and disposition of the parts thereof all as will more fully appear from the following description taken in connection with the accompanying drawing in which:—

Figure 1 is a sectional view of the source of light of this invention.

Figure 2 is a similar section of a portion of the lamp taken at right angles to Figure 1.

Figure 3 is a section taken on line 3—3, Figure 1.

Figure 4 diagrammatically illustrates the method of use of the source of light of this invention.

The source of light herein disclosed comprising an enclosing bulb formed of a bottle 1 of glass or similar material with a suitable stem 2 sealed into one end of the bottle. The edge of the bottle at its open end is ground accurately for sealing engagement with the periphery of a flat optical disc 3 of glass or other suitable material.

The disc 3 should be carefully sealed upon the bottle 1 and constitutes a flat optical front for the bottle so as not to distort the image of the slit hereinafter described.

The source of light here illustrated comprises a cathode 3 of U-shaped form and having a substantially straight front portion 5 which extends substantially parallel with the optical disc 3. Two leads 6 and 7 are shown as connected to the opposite terminals of the U-shaped cathode as it is desirable to heat the cathode during the process of manufacture but these leads in actual use may be united together to constitute a single lead by means of which the cathode is connected in circuit with an anode 8 during use of the source of light. This anode 8 may be in the form of a plate of suitable metal preferably extending substantially parallel with the U-shaped cathode and its terminal may be connected to lead 9.

These electrodes may be supported in any suitable manner upon the stem 2 and are disposed adjacent the optical disc 3. The cathode 4 is preferably provided with a coating of an alkaline earth oxide which permits operation of the lamp with comparatively low voltage direct current and also produces a more effective light for the purpose at hand.

Preferably the cathode is provided with a coating of barium oxide but in the course of manufacture it may be desirable to first coat the cathode with calcium oxide and then provide it with an exterior coating of barium oxide.

The bulb is evacuated and then filled with an inert gas such as preferably helium altho other gases may be used. A small percentage of nitrogen may be included with the helium in order to produce a more actinic source of light containing a considerable proportion of rays of the violet end of the spectrum.

The source of light so far described is also described and claimed in certain of my copending applications. The feature of this invention resides in the fact that a disc 10 which is formed of substantially opaque material as for instance low expansion steel is positioned between the cathode and the optical front of the bulb and is provided with a narrow elongated slit 11 in line with the front portion 5 of cathode 4 and this disc 10 is supported within the bulb in close proximity to the front portion 5 of the cathode as by brackets 12 and 13 secured to the stem 2.

The inert gas within the bulb is at such a pressure that at an operating voltage as for instance 300 to 400 volts direct current a highly intense concentrated glow is produced about the oxide coated cathode separate and distinct from the anode glow. In other words, this is not a lamp suitable for lighting or similar purposes but consists of a special arrangement whereby a comparatively highly intense cathode glow is produced, which glow is utilized for sound record production particularly because of its intense character and its capacity for sharply and accurately varying its intensity in accordance with electrical variations in the circuit to which it is connected.

In view of the fact that the disc 10 by reason of its being positioned within the bulb can be disposed closely adjacent the front end of cathode 5 about which the desired glow is concentrated there is produced at the slit 11 a highly intense concentrated light which is of sufficient intensity to permit the focusing of its image upon a film 14 in sufficiently intense condition to produce a record of required density.

Altho it is satisfactory to dispose the slit 11 directly over the wire constituting the front portion 5 of cathode 4 yet it is perhaps preferable to dispose the slit 11 slightly to one side of the portion 5 of the cathode so that the slit will not directly overlie the portion 5 but will overlie the glow that spreads to one side of the cathode 4.

This slight displacement is illustrated in Figure 2. Altho it is possible to form the slit 11 of the same size as the desired image to be produced upon the film yet it seems desirable to form the slit slightly larger as for instance .015 of an inch in width and then by a suitable lens system reduce the image of the slit to approximately .001 of an inch in width and .1 of an inch in length. In Figure 4 there is a diagrammatic illustration of the source of light of Figures 1, 2 and 3 with a lens or lens system 15 for focusing the image of the slit 11 upon the film 14.

A variation of the glow concentrated about the cathode 4 in accordance with sound wave variations may be effected in any usual and well known manner as for instance by connecting the source of light in circuit with the secondary 16 of the transformer and providing a source of potential as battery 17 and a resistance 18 connected across the circuit to maintain the cathode glow light constantly lighted.

The condenser 19 may be inserted in the transformer circuit to prevent the lighting current from flowing through that circuit. At this point any number of stages of amplifications may be inserted and the primary 17' of the transformer in the first circuit may be connected to a suitable microphone 20 for modulating the current flowing in the circuit in accordance with sound wave variations.

The disc 10 has the further advantage in that it prevents sputtering of the electrode material upon the optical front 3 which would obstruct the passage of light rays therethrough.

Altho I have shown and described a specific structure of apparatus and a particular form and relation of the parts thereof I do not desire to restrict myself to the details of form, construction or arrangement as various changes and modifications can be made within the scope of the appended claims.

I claim:

1. A source of light for producing a photographic record of light wave variations corresponding to sound wave variations comprising a bulb including a substantially flat optical window, an anode within the bulb, a cathode within the bulb, an ionizable gas within the bulb at such a pressure that at operating voltage a concentrated glow is produced about the cathode, an opaque member positioned between the cathode and said window and formed with a narrow elongated slit extending substantially parallel with the cathode.

2. A source of light for producing a photographic record of light wave variations corresponding to sound wave variations comprising a bulb including a substantially flat optical window, an anode within the bulb, a cathode within the bulb, an ionizable gas within the bulb at such a pressure that at operating voltage a concentrated glow is produced about the cathode, an opaque member positioned between the cathode and said window and formed with a narrow elongated slit extending substantially parallel with the cathode and offset slightly in a lateral direction.

THEODORE WILLARD CASE.